J. J. WEISS.
REMOVABLE SAW HANDLE.
APPLICATION FILED APR. 20, 1910.
965,617.
Patented July 26, 1910.
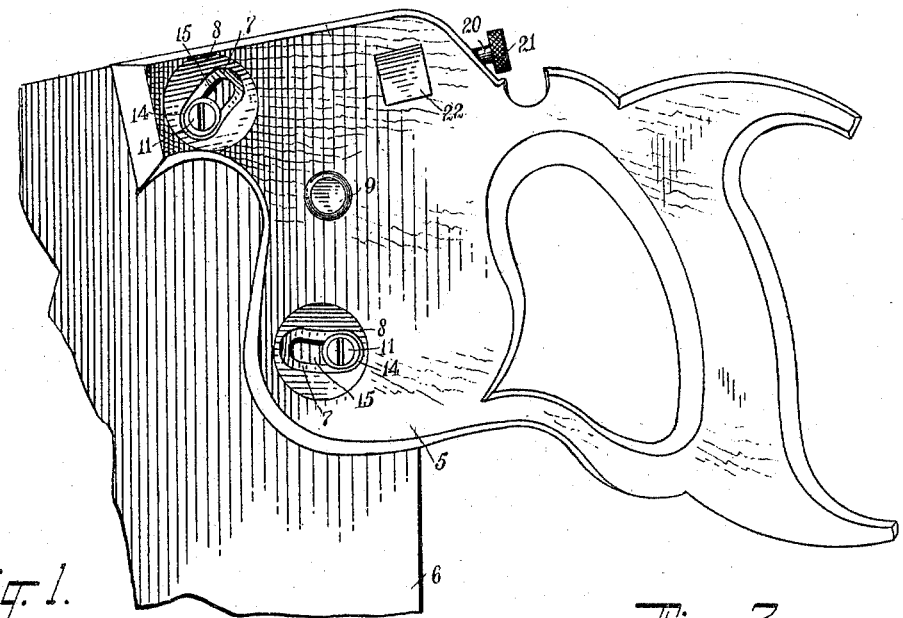
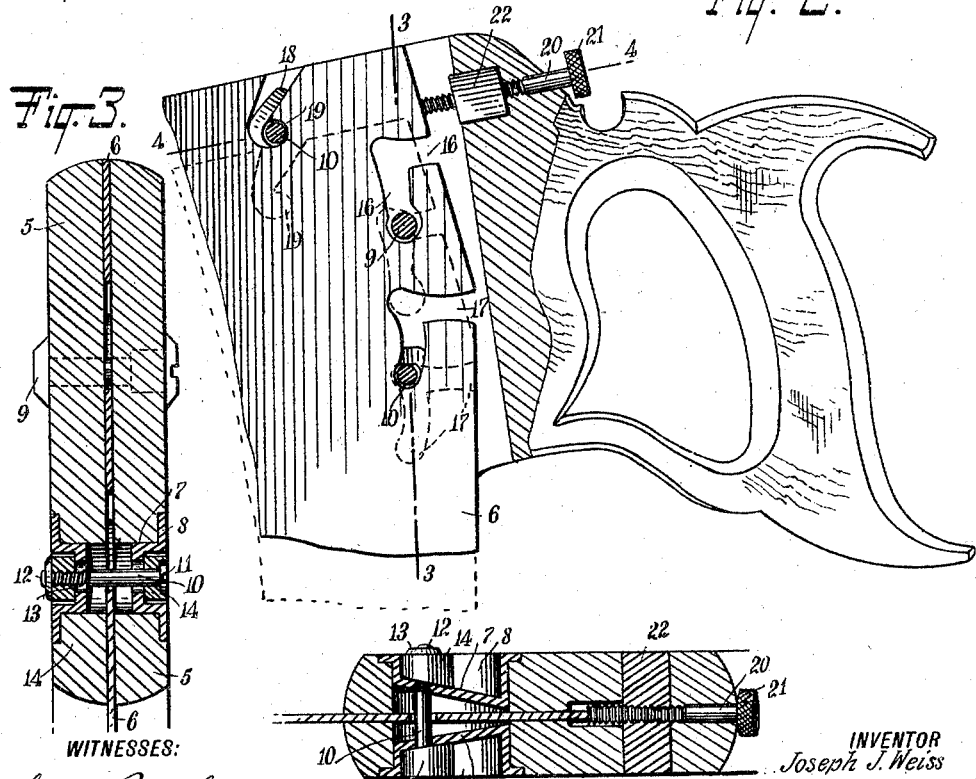
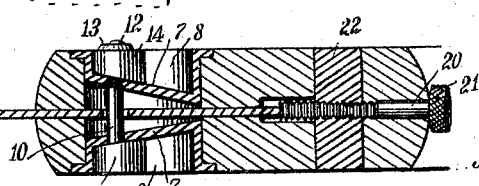
WITNESSES:
George Bambay.
INVENTOR
Joseph J. Weiss
BY Munn & Co
ATTORNEYS

UNITED STATES PATENT OFFICE.

JOSEPH J. WEISS, OF NEW YORK, N. Y.

REMOVABLE SAW-HANDLE.

965,617.  Specification of Letters Patent.  Patented July 26, 1910.

Application filed April 20, 1910. Serial No. 556,492.

*To all whom it may concern:*

Be it known that I, JOSEPH J. WEISS, a citizen of the United States, and a resident of the city of New York, borough of Manhattan, in the county and State of New York, have invented a new and Improved Removable Saw-Handle, of which the following is a full, clear, and exact description.

Among the principal objects which the present invention has in view are: to provide a handle of the character specified wherein the adjustment of said handle on the blade clamps the same; to provide means for locking the blade in clamped position; to provide means for compensating for wear of the clamping members; to provide means for adapting the handle to clamp blades of varied thickness; and to provide a universal single handle for a plurality of saw blades.

One embodiment of the present invention is disclosed in the structure illustrated in the accompanying drawings, in which like characters of reference denote corresponding parts in all the views, and in which—

Figure 1 is a fragmentary view in side elevation, showing a handle constructed in accordance with the present invention, and a fragment of saw blade connected therewith; Fig. 2 is a vertical section taken on the median line of Fig. 1; Fig. 3 is a vertical cross section taken on the line 3—3 in Fig. 2; and Fig. 4 is a longitudinal section taken on the line 4—4 in Fig. 2.

The handle illustrated in the accompanying drawings is provided with the usual kerfed section 5. In the construction wherein a blade 6 is permanently secured to the said handle, suitable fastening devices are passed between the sides of the kerfed section 5, clamping the same rigidly upon the sides of the blade at the hilt thereof. In the present invention the kerf is slightly enlarged to loosely grasp the hilt of the blade 6, and also to accommodate various blades, the thickness of which may vary slightly.

It is to provide for the clamping of the sides of the kerfed section 5 upon the hilt of the saw that I have provided inclined bottoms 7, 7 for the cups 8, 8. The cups 8, 8 are let into the sides of the section 5 at predetermined distances from a pivot pin 9. The bottoms 7, 7 of the cups 8, 8 are slotted to form passage ways for pins 10, 10. The pins 10, 10 may be of any desired form, that shown in the drawings being screws having slotted heads 11 and screw threaded ends 12, which are adapted to be overturned upon washers 13. In using the screw pin 10 any wear of the blocks 14, 14 on the bottoms 7, 7 may be taken up by upsetting the said screw pin and heading the end 12. The blocks 14, 14 are provided with an inclined under surface adapted to ride on the inclined surface of the bottoms 7, 7 and on the edge of slots 15, 15. The slots 15, 15 may be curved, the curvature being concentric with the center of the pivot pin 9. It will be understood that while the curvature of the slots 15 may produce a more perfect action, a sufficiently fine action might be produced with a slot which was straight. In the extension of the slots 15 the same circular path is approximated, which path is formed from the center of the pivot pin 9. The reason for this disposition of the cups 8, 8 is that as the blade 6 is sunk into position it is held to pivot on the pin 9.

The saw blade is provided with three bayonet slots 16, 17 and 18. Extensions of the slots 16 and 17 are substantially parallel with the upper or back edge of the blade 6, and are so disposed as to aline with the pin 9 and the pin 10 extended between the lower cups 8 when the top edge of the blade rests under the pin 10 in the upper cups 8. It will be understood that in this position of the blade 6 the pins 10, 10 are disposed at the ends of the cups 8, 8 opposite that having the widest divergence of the bottoms 7, 7. In this position of the blade 6 a rearward or handleward movement of the said blade slides the pin 9 and the lower pin 10 into the horizontal extension of the slots 16 and 17. When the said pins 9 and lower 10 now strike upon the ends of the horizontal extensions of the said slots 16 and 17, the upward edge opening of the slot 18 is disposed directly beneath the upper pin 10. In this position the blade 6 is raised vertically, or toward the upper edge of the kerfed section 5 of the handle. In doing this the upper pin 10 is inserted in the slot 18, while the pins 9 and lower 10 are carried to the lower end of the angular extensions of the slots 16 and 17. At the end of each of the slots there is provided a circular recess which serves to hold the pins in the desired set position. The said circular recess at the lower end of the slot 16 forms, in conjunction with the pin 9, a pivot for the swing into the lined position of the blade 6. The blade 6 in swinging in this manner moves forward the upper pin 10, and backward the lower pin 10, causing the blocks 14, 14 thereof to ride up the inclined surface of the bottoms 7, 7 of the cups 8, 8. In thus riding the bottoms 7, 7 the blocks 14, 14 draw the sides of the kerfed section 5 of the handle tight upon the sides of the blade to clamp the same rigidly in position. In this position of the blade and clamping members therefor it will be seen that the upper pin 10 rests in the circular extension 19 of the slot 18, the overhang whereof prevents the fall of the hilt of the blade when in operation.

To secure the blade in the set position just above described there is provided a follower screw 20, the knurled head 21 of which extends to the outer side and the back edge of the handle, as shown in Figs. 1 and 2 of the drawings. The screw 20 is of the type known as metal screws, and is threaded to fit the threads formed in a metal block 22 introduced through the wooden portion of the handle, and through a squared perforation extended therethrough. The threads of the screw 20 are sufficiently long to provide for the setting up of the screw against the rear edge of the blade, as shown in Fig. 2 of the drawings. In this position the screw serves to prevent the withdrawal of the upper pin 10 from the extension 19, and thereby holds the blade 6 rigidly in position, preventing, as it does, the swing of the blade in such manner as might draw the pins 9 and lower 10 from the lower extensions of the slots 16 and 17.

When it is desired to remove the blade 6 from the handle, the screw 20 is retracted by manipulating the head 21 until the end thereof is removed from the rear edge of the blade 6 sufficiently to permit the same to be moved backward far enough to pass the upper pin 10 from the extension 19 and into the slot 18. In this position the blade 6 may be swung back on the pivot pin 9 so that the blocks 14, 14 in each of the cups 8, 8 are carried to the more contracted sections of the bottoms 7, 7, allowing the kerf-separated sides of the section 5 of the handle to spread and release the said blade. In this position the blade is drawn downward from the handle until the pins 9 and lower 10 rest in the outwardly opening branch of the slots 16 and 17, and the upper pin 10 is withdrawn from the outwardly opening slot 18. By withdrawing the blade forward the pins 9 and lower 10 are drawn out of the slots 16 and 17.

When provided with a handle of the character described and a plurality or set of blades having the slots 16, 17 and 18 formed and arranged as described, it will be seen that the facility with which the saws necessary to the wood working trades may be carried in smaller compass, requiring but the one handle to a plurality of saw blades, is greatly increased.

Having thus described my invention, what I claim as new and desire to secure by Letters Patent is:—

1. A removable saw handle, comprising a kerfed handle; a fixed pivot pin mounted on said handle; a plurality of slotted plates mounted in the kerf-separated sides of said handle, having inclined surfaces to form a path concentric with said pivot pin; a roving pin having heads engaging the said inclined surfaces; a saw blade provided with a slot to receive said pivot pin, said slot having a longitudinally disposed edge opening section and a vertically disposed branch thereof, and said blade being further provided with a vertically disposed edge opening slot arranged to receive the said roving pin; and means for maintaining the blade in fixed relation with said pins.

2. A removable saw handle, comprising a kerfed handle; a fixed pivot pin mounted on said handle; a plurality of slotted plates having inclined surfaces disposed thereon in arrangement substantially concentric with said pivot pin; a plurality of roving pins having heads engaged with said inclined surfaces; a saw blade having a plurality of bayonet slots opening from the rear edge of said blade, adapted to aline with said pivot pin and one of said roving pins, said blade being further provided with a vertically disposed edge opening slot to aline with one of said roving pins and to engage the same when said blade is lifted to place the aforementioned pins in the locking extensions of said bayonet slots; and a follower screw mounted on said handle and in thread engagement therewith, adapted to force the said blade in fixed relation with said pins.

3. A removable saw handle, comprising a kerfed handle; a fixed pivot pin mounted on said handle; a plurality of slotted plates having inclined surfaces disposed thereon in arrangement substantially concentric with said pivot pin; a plurality of roving pins having heads engaged with said inclined surfaces; a saw blade having a plurality of bayonet slots opening from the rear edge of said blade, adapted to aline with said pivot pin and one of said roving pins, said blade being further provided with a vertically disposed edge opening slot to aline with one of said roving pins and to engage the same when said blade is lifted to place the aforesaid pins in the locking extensions of said bayonet slots; a metal block inserted in said handle and transversely provided with a screw thread; and a follower screw, thread engaged with said screw thread in said block and arranged to impinge upon said blade to hold the same in fixed relation with said pins.

4. A removable saw handle, comprising a handle having a kerf-separated blade holding extension; a perforation formed in the walls thereof; a plurality of slotted clamping plates mounted in line with said perforations and having outwardly inclined surfaces; a roving pin extended through said slots and having heads to engage the said inclined surfaces; and means connected with the saw blade for engaging and moving the said roving pin to cause the said heads to travel upward on said inclined surfaces.

In testimony whereof I have signed this specification in the presence of two subscribing witnesses.

JOSEPH J. WEISS.

Witnesses:
E. F. MURDOCK,
PHILIP D. ROLLHAUS.